(12) United States Patent
Schwing et al.

(10) Patent No.: US 11,699,239 B2
(45) Date of Patent: Jul. 11, 2023

(54) IMAGE PROCESSING METHOD AND APPARATUS

(71) Applicants: The Board of Trustees of the University of Illinois (Urbana, IL), Urbana, IL (US); SAMSUNG ELECTRONICS CO., LTD., Suwon-si (KR)

(72) Inventors: Alexander Schwing, Champaign, IL (US); Colin Graber, Urbana, IL (US); Raymond Yeh, Urbana, IL (US); Jihye Kim, Anyang-si (KR); Jaejoon Han, Seoul (KR)

(73) Assignees: The Board of Trustees of the University of Illinois (Urbana, IL), Urbana, IL (US); Samsung Electronics Co., Ltd., Suwon-si (KR)

( * ) Notice: Subject to any disclaimer, the term of this patent is extended or adjusted under 35 U.S.C. 154(b) by 127 days.

(21) Appl. No.: 17/228,760

(22) Filed: Apr. 13, 2021

(65) Prior Publication Data

US 2021/0327074 A1 Oct. 21, 2021

Related U.S. Application Data

(60) Provisional application No. 63/013,107, filed on Apr. 21, 2020.

(30) Foreign Application Priority Data

Jul. 14, 2020 (KR) .................. 10-2020-0086572

(51) Int. Cl.
*G06T 7/215* (2017.01)
*G06T 7/73* (2017.01)
(Continued)

(52) U.S. Cl.
CPC ........ *G06T 7/215* (2017.01); *B60W 30/0956* (2013.01); *G06N 3/08* (2013.01); *G06T 7/246* (2017.01); *G06T 7/73* (2017.01); *G06V 20/10* (2022.01); *G06V 20/58* (2022.01); *G06V 40/103* (2022.01); *G06V 40/23* (2022.01); *G06T 2207/30241* (2013.01)

(58) Field of Classification Search
None
See application file for complete search history.

(56) References Cited

U.S. PATENT DOCUMENTS

| 2019/0114777 | A1 | 4/2019 | Maity et al. |
| 2019/0323852 | A1 | 10/2019 | Ondruska et al. |
| 2022/0292867 | A1* | 9/2022 | Zhang ................. G06N 3/0481 |

FOREIGN PATENT DOCUMENTS

| EP | 3783538 A1 * | 2/2021 | ........... G06N 3/0445 |
| JP | 2010-152487 A | 7/2010 | |

(Continued)

OTHER PUBLICATIONS

Multi-Modal Trajectory Prediction of Surrounding Vehicles with Maneuver based LSTMs. Deo et al. (Year: 2018).*

(Continued)

*Primary Examiner* — Delomia L Gilliard
(74) *Attorney, Agent, or Firm* — NSIP Law

(57) ABSTRACT

An image processing method includes defining relations between entities of a target of which a motion is to be predicted from an image of a first time point based on a feature vector of the entities, estimating a dynamic interaction between the entities at the first time point based on the defined relations between the entities, predicting a motion of the entities changing at a second time point based on the estimated dynamic interaction, and outputting a result to which the motion predicted at the second time point is applied.

19 Claims, 8 Drawing Sheets

(51) Int. Cl.
*G06N 3/08* (2023.01)
*G06T 7/246* (2017.01)
*B60W 30/095* (2012.01)
*G06V 20/10* (2022.01)
*G06V 20/58* (2022.01)
*G06V 40/20* (2022.01)
*G06V 40/10* (2022.01)

(56) References Cited

FOREIGN PATENT DOCUMENTS

| | | |
|---|---|---|
| JP | 2013-45447 A | 3/2013 |
| JP | 2015-179514 A | 10/2015 |
| JP | 2020-11326 A | 1/2020 |
| KR | 10-1004157 B1 | 12/2010 |
| KR | 10-2013-0092272 A | 8/2013 |
| KR | 101510373 B1 | 4/2015 |
| KR | 10-2016-0031900 A | 3/2016 |

OTHER PUBLICATIONS

Kipf, Thomas, et al., "Neural Relational Inference for Interacting Systems," *International Conference on Machine Learning. PMLR*, 2018 (pp. 1-17).

Sun, Chen, et al., "Stochastic Prediction of Multi-Agent Interactions from Partial Observations," *arXiv preprint arXiv:1902.09641*, Feb. 25, 2019 (pp. 1-15).

Xu, Zhenjia, et al., "Unsupervised Discovery of Parts, Structure, and Dynamics," *arXiv preprint arXiv:1903.05136*, Mar. 12, 2019 (pp. 1-15).

\* cited by examiner dNRI

Static NRI

S. NRI (Dyn. Inf.)

IMAGE PROCESSING METHOD AND APPARATUS

CROSS-REFERENCE TO RELATED APPLICATIONS

This application claims the benefit under 35 U.S.C. § 119(e) of U.S. Provisional Application No. 63/013,107 filed on Apr. 21, 2020, in the U.S. Patent and Trademark Office, and claims the benefit under 35 U.S.C. § 119(a) of Korean Patent Application No. 10-2020-0086572 filed on Jul. 14, 2020, in the Korean Intellectual Property Office, the entire disclosures of which are incorporated herein by reference for all purposes.

BACKGROUND

Field

The following description relates to an image processing method and apparatus.

Description of Related Art

For a task such as forecasting or prediction, an interaction among entities, for example, in the context of a sporting event, joints of a human body and players of a sports team, may need to be considered. However, it is not easy to observe and quantify such an interaction among entities. In addition, a relationship among entities may change over time, and it is thus difficult to apply such a change based on time to an interaction among the entities.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In one general aspect, there is provided an image processing method includes defining relations between entities of a target of which a motion is to be predicted from an image of a first time point based on a feature vector of the entities, estimating a dynamic interaction between the entities at the first time point based on the defined relations between the entities, predicting a motion of the entities changing at a second time point based on the estimated dynamic interaction, and outputting a result to which the motion predicted at the second time point is applied.

The relations between the entities may be determined based on at least one of connections between the entities, positions of the entities, postures of the entities, movement directions of the entities, movement speeds of the entities, motion trajectories of the entities, a rule applied to the entities, motion patterns of the entities based on the rule, a regulation applied to the entities, or motion patterns of the entities based on the regulation.

The defining of the relations between the entities may include generating hidden state information corresponding to the relations between the entities at the first time point by applying the feature vector to a graph neural network (GNN) including nodes corresponding to the entities and edges corresponding to the relations between the entities.

The GNN may include a fully-connected GNN configured to generate the hidden state information corresponding to a state of relations between pairs of the entities based on the feature vector.

The estimating of the dynamic interaction may include generating prior information corresponding to the entities based on the hidden state information, generating posterior information predicted in association with the entities based on the prior information and the hidden state information, and generating a latent variable corresponding to the dynamic interaction between the entities based on the prior information and the posterior information.

The prior information may be determined based on a history of relations between the entities up to a time point before the first time point, and on feature vectors of the entities input up to the first time point.

The generating of the prior information may include generating the prior information by transferring the hidden state information as forward state information to a forward long short-term memory (LSTM).

The generating of the posterior information may include generating the posterior information by transferring the prior information and the hidden state information as backward state information to a backward LSTM.

The generating of the latent variable may include sampling a result in which the prior information and the posterior information are combined, and generating the latent variable corresponding to the dynamic interaction between the entities at the first time point based on a result of the sampling.

The generating of the latent variable may include optimizing the latent variable based on the prior information.

The entities of the target may include at least one of body parts of a user, joints of a user, pedestrians, vehicles, or players of a sports team.

The predicting of the motion of the entities may include predicting the motion changing at the second time point by decoding the estimated dynamic interaction.

The outputting of the result to which the predicted motion is applied may include processing the image of the first time point to be an image of the second time point by applying the predicted motion to the entities included in the image of the first time point, and outputting the image of the second time point.

The outputting of the result to which the predicted motion is applied may include processing the image of the first time point to be the image of the second time point by applying the predicted motion to the entities included in the image of the first time point, perceiving whether a dangerous situation occurs based on the image of the second time point, and outputting an alarm corresponding to the dangerous situation.

The image processing method may further include determining the entities of the target of which the motion is to be predicted.

In another general aspect, there is provided an image processing apparatus includes a communication interface configured to receive an image of a first time point including entities of a target of which a motion is to be predicted, a processor configured to extract a feature vector of the entities from the image of the first timepoint, to estimate a dynamic interaction between the entities at the first time point based on relations between the entities defined based on the feature vector, and to predict a motion of the entities changing at a second time point based on the estimated dynamic interaction, and an output device configured to output a result to which the motion predicted at the second time point is applied.

The processor may include a prior configured to generate prior information that is determined based on a history of relations between the entities up to a time point before the first time point and on feature vectors corresponding to the entities input up to the first time point, an encoder configured to generate a latent variable corresponding to the dynamic interaction between the entities based on the feature vector and the prior information, and a decoder configured to predict the motion of the entities changing at the second time point based on the latent variable.

The encoder may include a fully-connected GNN configured to generate hidden state information corresponding to a state of relations between pairs of the entities based on the feature vector, a forward LSTM configured to generate the prior information corresponding to the entities of the target in the image of the first time point based on the hidden state information, a backward LSTM configured to generate posterior information predicted based on the dynamic interaction between the entities based on the prior information and the hidden state information, and a multi-layer perceptron (MLP) configured to generate the latent variable corresponding to the dynamic interaction between the entities at the first time point based on the prior information transferred through the forward LSTM and the posterior information transferred through the backward LSTM.

The image processing apparatus may include at least one of a head-up display (HUD), a three-dimensional (3D) digital information display (DID) (3D DID), a 3D mobile device, or a smart vehicle.

Other features and aspects will be apparent from the following detailed description, the drawings, and the claims.

Figure 1:
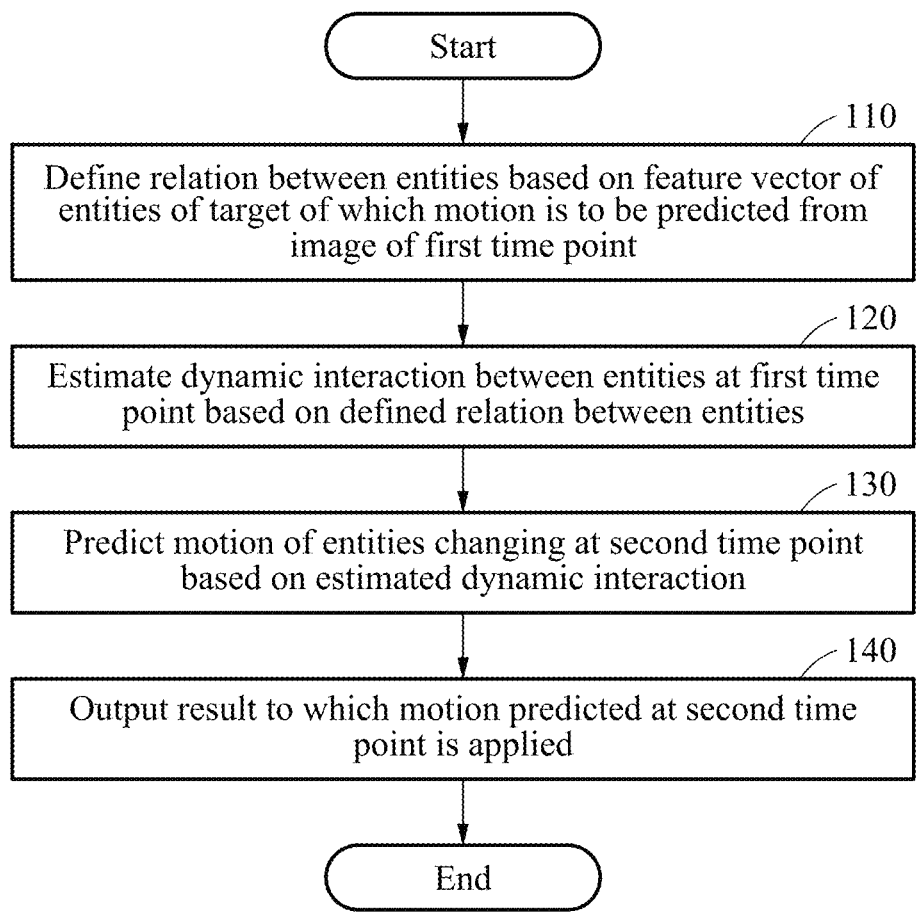
FIG. 1 is a diagram illustrating an example of an image processing method.

Throughout the drawings and the detailed description, unless otherwise described or provided, the same drawing reference numerals will be understood to refer to the same elements, features, and structures. The drawings may not be to scale, and the relative size, proportions, and depiction of elements in the drawings may be exaggerated for clarity, illustration, and convenience.

DETAILED DESCRIPTION

The following detailed description is provided to assist the reader in gaining a comprehensive understanding of the methods, apparatuses, and/or systems described herein. However, various changes, modifications, and equivalents of the methods, apparatuses, and/or systems described herein will be apparent after an understanding of the disclosure of this application. For example, the sequences of operations described herein are merely examples, and are not limited to those set forth herein, but may be changed as will be apparent after an understanding of the disclosure of this application, with the exception of operations necessarily occurring in a certain order. Also, descriptions of features that are known may be omitted for increased clarity and conciseness.

The features described herein may be embodied in different forms, and are not to be construed as being limited to the examples described herein. Rather, the examples described herein have been provided merely to illustrate some of the many possible ways of implementing the methods, apparatuses, and/or systems described herein that will be apparent after an understanding of the disclosure of this application.

The terminology used herein is for the purpose of describing particular examples only, and is not to be used to limit the disclosure. As used herein, the singular forms "a," "an," and "the" are intended to include the plural forms as well, unless the context clearly indicates otherwise. As used herein, the term "and/or" includes any one and any combination of any two or more of the associated listed items. As used herein, the terms "include," "comprise," and "have" specify the presence of stated features, numbers, operations, elements, components, and/or combinations thereof, but do not preclude the presence or addition of one or more other features, numbers, operations, elements, components, and/or combinations thereof.

In addition, terms such as first, second, A, B, (a), (b), and the like may be used herein to describe components. Each of these terminologies is not used to define an essence, order, or sequence of a corresponding component but used merely to distinguish the corresponding component from other component(s).

Throughout the specification, when an element, such as a layer, region, or substrate, is described as being "on," "connected to," or "coupled to" another element, it may be directly "on," "connected to," or "coupled to" the other element, or there may be one or more other elements intervening therebetween. In contrast, when an element is described as being "directly on," "directly connected to," or "directly coupled to" another element, there can be no other elements intervening therebetween. Likewise, expressions, for example, "between" and "immediately between" and "adjacent to" and "immediately adjacent to" may also be construed as described in the foregoing.

Unless otherwise defined, all terms, including technical and scientific terms, used herein have the same meaning as commonly understood by one of ordinary skill in the art to which this disclosure pertains consistent with and after an understanding of the present disclosure. Terms, such as those defined in commonly used dictionaries, are to be interpreted as having a meaning that is consistent with their meaning in the context of the relevant art and the present disclosure, and are not to be interpreted in an idealized or overly formal sense unless expressly so defined herein.

Also, in the description of example embodiments, detailed description of structures or functions that are thereby known after an understanding of the disclosure of the present application will be omitted when it is deemed that such description will cause ambiguous interpretation of the example embodiments.

Hereinafter, examples will be described in detail with reference to the accompanying drawings, and like reference numerals in the drawings refer to like elements throughout.

FIG. 1 is a diagram illustrating an example of an image processing method. The operations in FIG. 1 may be performed in the sequence and manner as shown, although the order of some operations may be changed or some of the operations omitted without departing from the spirit and scope of the illustrative examples described. Many of the operations shown in FIG. 1 may be performed in parallel or concurrently. One or more blocks of FIG. 1, and combinations of the blocks, can be implemented by special purpose hardware-based computer, such as a processor, that perform the specified functions, or combinations of special purpose hardware and computer instructions.

Referring to FIG. 1, in operation 110, an image processing apparatus defines relations between entities of a target of which a motion or movement is to be predicted from an image of a first time point based on a feature vector of the entities. Here, the term "target" of which a motion is to be predicted may be construed as encompassing all objects including animate objects such as human beings, animals, and plants, and including also various types of inanimate objects which move, get displaced, change in motion, and/or change in form such as, for example, ball, vegetation, vehicles, motorcycles, and bicycles. The target may be construed as being a grouped form of entities or objects.

The entities may be construed as all objects having organic connections or organic relationships with the target of which the motion is to be predicted. The entities may correspond to a portion of components of the target and/or a portion of the target of which the motion is to be predicted.

The entities of the target may be, for example, body parts of a single user, joints of a single user, pedestrians, vehicles, and players of a sports team, but not limited thereto. For example, when the target of which the motion is to be predicted is a sports team, the entities of the target may correspond to players playing in the sports team. For example, when the target of which the motion is to be predicted is a plurality of pedestrians, the entities of the target may correspond to five different pedestrians moving in front of a vehicle. For example, when the target of which the motion is to be predicted is a user A or a hand of a user B, the entities of the target may correspond to body parts of the user A or knuckles of the hand of the user B. For example, when the target of which the motion is to be predicted is a material W, the entities of the target may correspond to elements included in the material W.

The feature vector of the entities may include, for example, a position and a speed of each of the entities, but not limited thereto. The feature vector of the entities may correspond to a motion trajectory of the entities, for example.

For example, a motion of joints of a human body may be limited by skeletons, players of a sports team may move according to practiced formations. In addition, a means of transportation may move according to enforced traffic regulations or rules. The relations between the entities may be determined based on, for example, connections between the entities, positions of the entities, postures of the entities, movement directions of the entities, movement speeds of the entities, motion trajectories of the entities, a rule applied to the entities, a motion pattern of the entities based on the rule applied to the entities, a regulation applied to the entities, a motion pattern of the entities based on the regulation, and the like.

Figure 3:
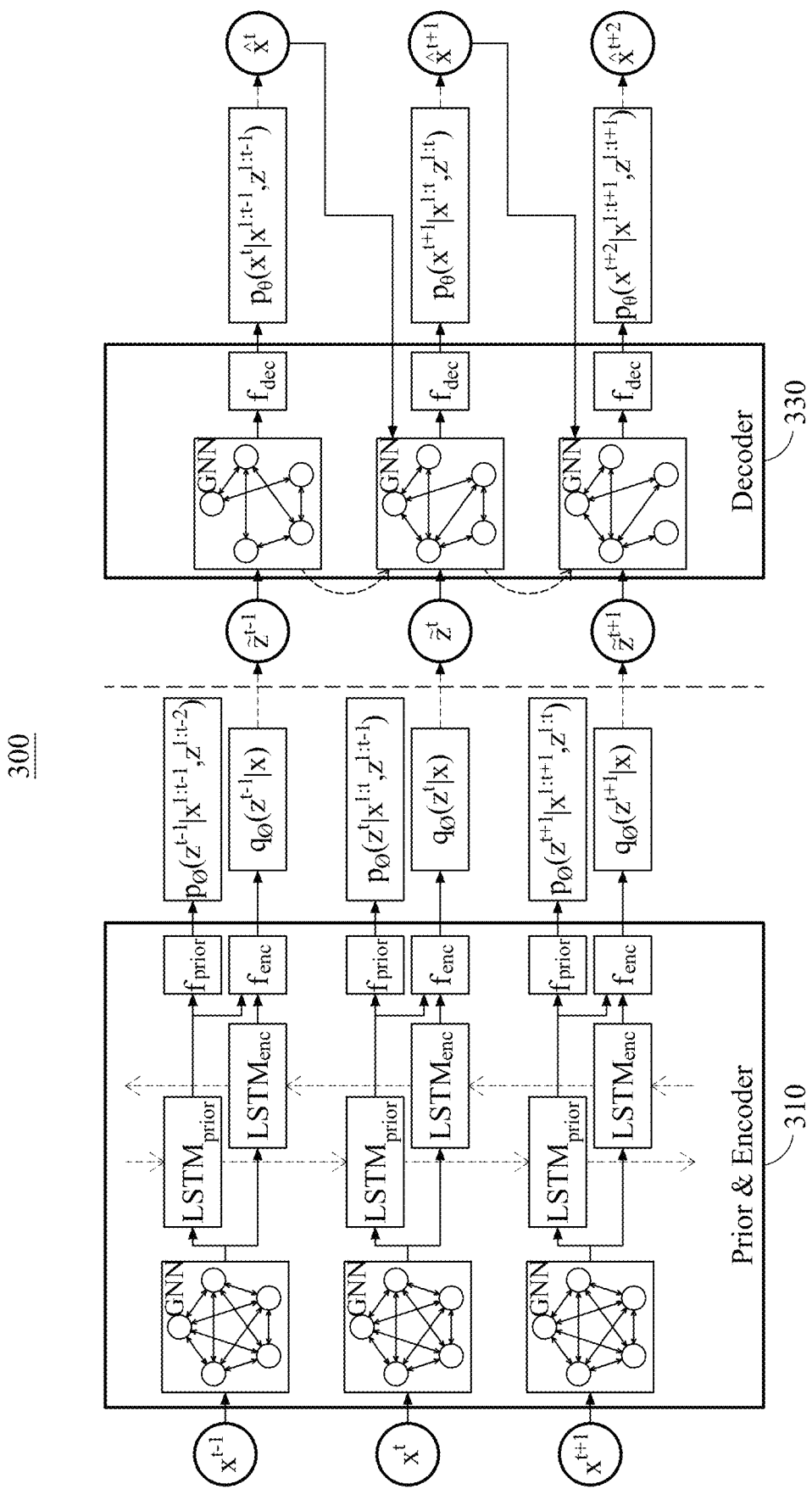

In operation 110, the image processing apparatus generates hidden state information corresponding to the relations between the entities at the first time point by applying the feature vector to a graph neural network (GNN) illustrated in FIG. 3, for example. The GNN may include nodes corresponding to the entities and edges corresponding to the relations between the entities. The GNN may be a fully-connected GNN to generate the hidden state information corresponding to a state of the relations between pairs of the entities based on the feature vector. The hidden state information generated through the GNN by the image processing apparatus may correspond to relation embeddings, for example, $h^t_{(i,j),emb}$, which are to be described hereinafter.

In an example, a hidden state may be an internal state of nodes included in a neural network, for example, the GNN, and hidden state information may be information indicating the internal state of the nodes included in the neural network. For example, temporal information in which sets of information processed at previous time points by a feedback architecture of the neural network are accumulated may be embedded in the hidden state. The hidden state information may be information in the form of a vector, such as, for example, a hidden state vector. In addition, the hidden state information may include a feature vector corresponding to one or more entities of the target that are included in an image frame of the first time point and a previous time point before the first time point.

Hereinafter, for the convenience of description, the previous time point before the first time point will also be represented as t−1 corresponding to the past, and the first time point will also be represented as t corresponding to the present, and a second time point will also be represented as t+1 corresponding to the future.

In operation 120, the image processing apparatus estimates a dynamic interaction between the entities at the first time point based on the relations between the entities defined in operation 110. The dynamic interaction may be represented in the form of a latent variable indicating the relations between the entities, for example.

To determine an interaction between entities, a surrogate task may be studied, for example, a task of predicting a trajectory over time. For example, when N entities to be modeled are given, $x_i^{(t)}$ may indicate a feature vector of the entities in a time step t. In this example, the feature vector of the entities may indicate a position and a speed, for example.

In general, a neural relational inference (NRI) framework that analyzes a relation between entities in the process of predicting system dynamics may predict a trajectory by predicting a series of interactions between the entities. Here, an accurately predicted interaction may enable the prediction of an accurate trajectory, and thus the interaction may be used to improve the prediction of a future trajectory. However, such an NRI method is based on the assumption that such a relation is maintained statically in an observed trajectory. In addition, a relation between entities changes over time in many systems. Using the NRI method, an interaction averaged over time may be retrieved. However, the averaged interaction may not accurately represent a basic system.

For example, an interaction between entities may be represented in the form of a latent variable $z_{i,j} \in \{1, \ldots, e\}$ with respect to pairs i and j of all the entities. In this example, e denotes the number of relation types to be modeled. The latent variable may also be referred to as a latent relation variable.

Although such a relation does not have a predefined meaning, a model by the relation types may learn a method of assigning a meaning to each relation type. To predict a latent variable $z_{i,j}$ and future trajectories of entities, the NRI method may learn or train a variational autoencoder (VAE).

An observed variable may indicate a trajectory x of entities and a latent variable may indicate a relation z between the entities. According to a traditional VAE, an evidence lower bound (ELBO) may be maximized as represented by Equation 1 below.

$$\mathcal{L}(\phi,\theta)=\mathbb{E}_{q_\phi(z|x)}[\log p_\theta(x|z)]-KL[q_\phi(z|x)\|p(z)], \quad \text{[Equation 1]}$$

In Equation 1, $\phi$ and $\theta$ denote an encoder parameter and a decoder parameter, respectively. Equation 1 may include three main probability distributions, which will be described hereinafter.

The VAE may be a generative model of which an objective is to generate data by learning a probability distribution P(x). An encoder of the VAE may receive learning data x as an input, and output a parameter associated with a probability distribution of a latent variable z. For example, in the case of a Gaussian normal distribution, $\mu$ and $\sigma^2$ may be output. For example, when data is given, the encoder may find a desirable probability distribution p(z|x) that samples a latent variable z for a decoder of the VAE to restore it to the original data. The decoder of the VAE may receive, as an input, a vector sampled from a probability distribution p(z) of the latent variable, and restore an original image using the received sampled vector. The decoder may receive, as an input, a sample extracted from the encoder, and reconstruct it to its original form.

As described above, the VAE may find a latent variable distribution that describes given data through optimization (which is performed by the encoder), and restore an original image from a latent variable (which is performed by the decoder).

In an example, a dynamic NRI (dNRI) method that restores an interaction between entities at all time points based on a relation between the entities changing over time may be used. In an example, a continuous latent variable may enable the prediction of separate relation graphs in each time step, and it is thus possible to solve an issue in the (static) NRI method described in the foregoing and improve the accuracy in prediction.

For example, the dNRI method may estimate an interaction between entities by a latent variable model. A latent variable may indicate an intensity of a relation between the entities. In an example, using an estimated relation intensity, it is possible to accurately restore an observed motion trajectory of entities. Compared to the NRI method, the dNRI method may estimate latent variables at all time points.

In an example, to learn or train both a sequential relation prior that is dependent on a history of an input trajectory, and an approximate relation posterior based on both past and future variable states, a sequential latent variable model may be applied to the NRI framework.

Although to be described hereinafter with reference to FIGS. 5 and 6, it is possible to evaluate a result of applying the dNRI method to a complicated motion capture and sports trajectory dataset. Compared to the static NRI method, the dNRI method may greatly improve the restoration of an observed trajectory. In addition, the dNRI method may predict relations that change different phases of the trajectory, which may not be achieved by the static NRI method.

In operation 120, the image processing apparatus generates prior information corresponding to the entities based on the hidden state information. The prior information may be, for example, a prior $p_\phi(z|x)$ to be described hereinafter. The prior information may indicate an intensity of the relations between the entities. The prior information may be determined based on a history of relations between the entities up to a time point before the first time point and on feature vectors of the entities input up to the first time point. For example, the image processing apparatus may generate the prior information by transferring the hidden state information as forward state information to a forward long short-term memory (LSTM), or $\text{LSTM}_{prior}$ illustrated by reference numeral 310 in FIG. 3.

In operation 120, the image processing apparatus also generates posterior information predicted in association with the entities based on the prior information and the hidden state information. For example, the image processing apparatus may generate the posterior information by transferring the prior information and the hidden state information as backward state information to a backward LSTM, or $\text{LSTM}_{enc}$ illustrated by reference numeral 310 in FIG. 3. The posterior information may be, for example, an approximate posterior $q_\phi(z|x)$ to be described hereinafter.

In operation 120, the image processing apparatus generates a latent variable corresponding to the dynamic interaction between the entities based on the prior information and the posterior information. The image processing apparatus may sample a result of combining the prior information and the posterior information. Based on a result of the sampling, the image processing apparatus may generate a latent variable $\tilde{z}$ corresponding to the dynamic interaction between the entities at the first time point. The image processing apparatus may optimize the latent variable based on the prior information.

In operation 130, the image processing apparatus predicts a motion of the entities changing at a second time point based on the dynamic interaction estimated in operation 120. The image processing apparatus may predict a motion of the target changing at the second time point by decoding the estimated dynamic interaction by a decoder, for example, a decoder 330 illustrated in FIG. 3. The decoder may predict a trajectory distribution, for example, $p_\theta(x|\tilde{z})$, from a result of sampling relation variables generated in an encoder.

In operation 140, the image processing apparatus outputs a result to which the motion predicted at the second time point is applied. In operation 140, the image processing apparatus may implicitly or explicitly output the result to which the motion predicted at the second time point is applied. In operation 140, the image processing apparatus may process the image of the first time point to be an image of the second time point by applying the predicted motion to the entities included in the image of the first time point, and output the image of the second time point. In another example, the image processing apparatus may perceive whether a dangerous situation occurs based on the image of the second time point, and output an alarm corresponding to the dangerous situation.

In an example, a dynamic interaction between entities over time may be estimated from an input image, and the estimated dynamic interaction may be used for automatic data annotation for target segmentation, tracking, and deep learning processing. For example, the image processing apparatus may estimate a dynamic interaction between entities over time from an input image and predict, for example, a future motion of players in a sports game, a future motion of children or pedestrians in front of a self-driving vehicle, a future motion of vehicles, or the like. For example, estimating a future motion of players in a sports game may enable the detection of a main game scene and enable an image of the main game scene to be effectively transmitted to an audience watching the sports game. In addition, the image processing apparatus may predict a motion of vehicles or pedestrians and warn drivers or persons concerned of a potential accident that may occur in the future, thereby preventing the accident. For other examples, in the case of typing, the image processing apparatus may also predict a pattern of a finger motion or movement in typing, and thus reinforce the performance of recognizing a typing pattern in a virtual keyboard. In the case of physics, the image processing apparatus may also predict a future motion or movement of elements in physics, and thus contribute to the development of related research fields such as an analysis of relationships of materials or matters.

Figure 2:
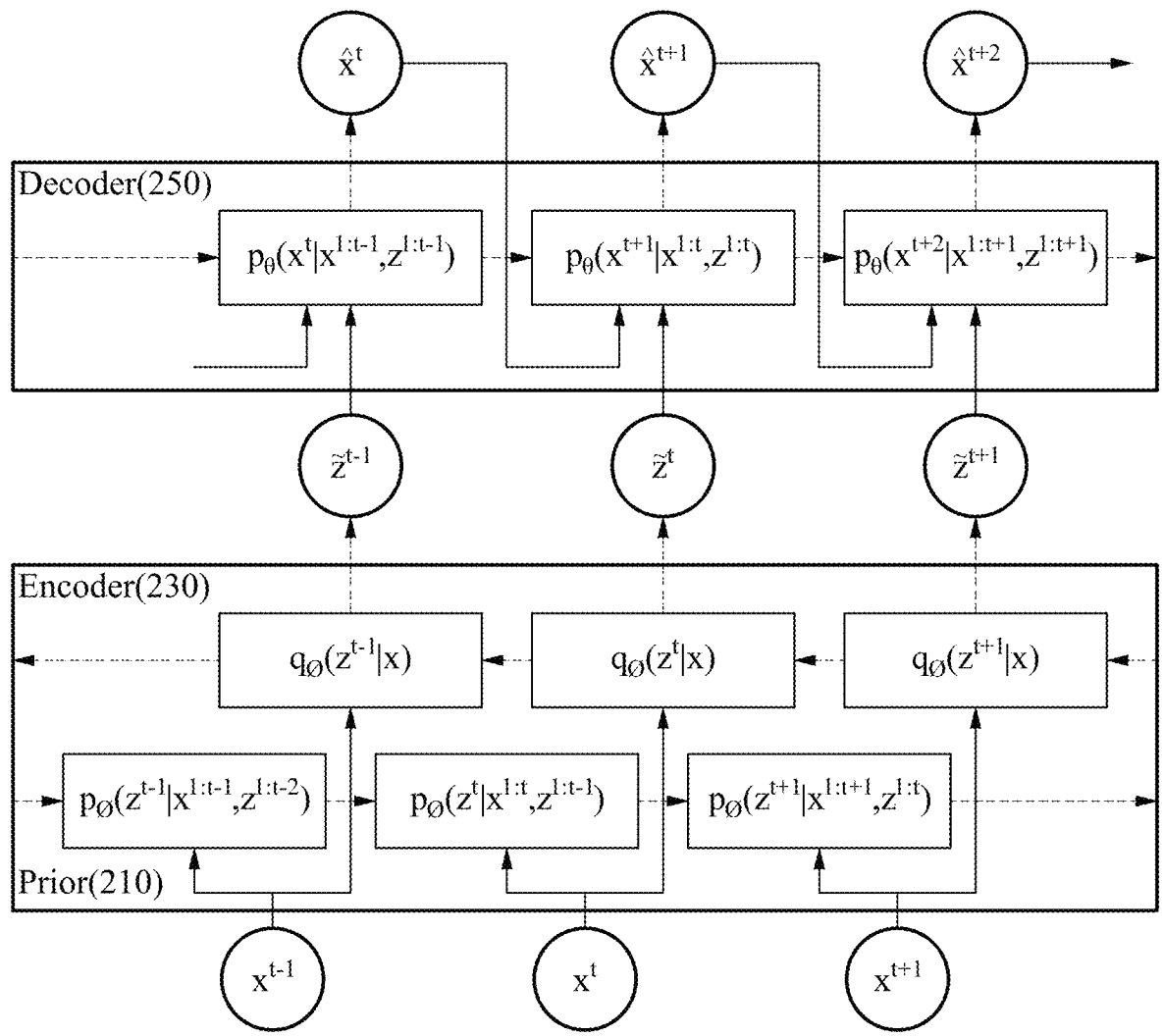
FIGS. 2 and 3 are diagrams illustrating examples of components of an image processing apparatus and operations of the components.

FIG. 2 is a diagram illustrating an example of a calculation graph to describe operations of an image processing apparatus. Referring to FIG. 2, an image processing apparatus 200 includes a prior 210, an encoder 230, and a decoder 250.

In an example, it is predicted that relations between entities differ in each time step in a dNRI method, and thus such changes may need to be captured in a prior variance. In this example, learning or training may be performed by an auto-regressive model for prior probabilities of the relations between the entities.

The prior 210 may generate prior information that is determined based on a history of relations between entities up to a time point before a first time point and on feature vectors corresponding to the entities input up to the first time point, based on an input feature vector, for example, $x^{t-1}$, $x$, and $x^{t+1}$.

The prior 210 may be adjusted based on previous relations, in addition to a previous relation in each time step t and inputs in times from 0 to t.

The prior 210 may be represented by Equation 2 below.

$$p_\phi(z|x) := \prod_{t=1}^{T} p_\phi(z^t | x^{1:t}, z^{1:t-1}). \quad \text{[Equation 2]}$$

A structure of the prior 210 used herein will be described in detail with reference to FIG. 3.

For example, in the case in which an edge in a GNN is hard-corded to indicate that there is no interaction, a prior value of the edge, for example, prior information corresponding to the edge, may be selected based on estimated sparsity of a relationship for a given problem or matter. The prior information may adjust a loss such that the encoder 230 is biased based on a sparsity level. For example, the prior information may guide the encoder 230 to generate hidden state information corresponding to each pair of entities in each time step.

The encoder 230 may generate a latent variable corresponding to a dynamic interaction between the entities based on the feature vector and the prior information generated in the prior 210.

In an example, the encoder 230 may approximate a relation distribution in each time step as a function of an entire input, unlike a past input history. An actual posterior distribution $p_\theta(z|x)$ for the latent variable may correspond to a function of future states of observed variables x. Thus, a core component of the encoder 230 may be an LSTM that reversely processes states of variables.

The encoder 230 may be embodied using a fully-connected GNN architecture including one node per entity as illustrated by reference numeral 310 in FIG. 3. The encoder 230 may be used to generate a posterior relation probability of all relation types to be predicted after learning an embedding of each pair of the entities. When a distribution is given by the encoder 230, sampled relations may be used as an input in the decoder 250. The encoder 230 may differentiate a sampling process such that model weights are updated through backpropagation. However, in a categorical distribution, standard sampling may not be distinguishable, and thus a sample may be extracted from a concrete distribution. Such a distribution may be a continuous approximation to a discontinuous categorical distribution, and sampling in this distribution may be performed in the form of Equation 3 below.

$$z_{i,j} \sim \text{softmax}((h_{i,j}+g)/\tau), \quad \text{[Equation 3]}$$

In Equation 3, $h_{i,j}$ denotes posterior logits predicted with respect to $z_{i,j}$, and g denotes a sample of a Gumbel (0,1) distribution. $\tau$ denotes a temperature parameter that controls distribution smoothness.

Such a process described above may approximate discrete sampling in a different way, and backpropagate gradients up to a parameter $\phi$ of the encoder 230 in the reconstruction in the decoder 250.

The components of the encoder 230 will be described in detail with reference to FIG. 3.

The decoder 250 may predict a motion of the entities that changes at a second time point based on the latent variable(s) generated in the encoder 230, for example $\tilde{z}^{t-1}$, $\tilde{z}$, and $\tilde{z}^{t+1}$.

The decoder 250 may be represented as $p_\theta(x|z)$. The decoder 250 may use the latent variables sampled in the encoder 230 to help predict the future states of the variables x. A latent variable z to be input to the decoder 250 may vary in each time step.

The decoder 250 may be represented by Equation 4 below.

$$p_\theta(x|z) := \prod_{t=1}^{T} p_\theta(x^{t+1} | x^{1:t}, z^{1:t}). \quad \text{[Equation 4]}$$

In fact, this may be related to selecting a GNN model for all edges in each time step, instead of using the same model in an entire sequence. Through this, the decoder 250 may adjust a prediction based on a system state, and improve a function of modeling a dynamic system.

Similar to the encoder 230, the decoder 250 may also be embodied based on a GNN. However, dissimilar to the encoder 230, in the decoder 250, a separate GNN may be learned or trained for all edge types. For example, when a message, or information, of a given edge (i, j) is transferred, an edge model used may correspond to a prediction generated by a latent variable input to the decoder 250. In addition, to indicate that there is no interaction, an edge type may be hard-coded. In such a case, a message to be transferred through a corresponding edge during a calculation may not exist.

The decoder 250 may be a Markovian decoder, for example. In such a case, a GNN of the decoder 250 may be simply a function of a previous prediction, and a hidden state repeating in decoders dependent on all previous states may be updated using the GNN.

FIG. 3 is a diagram illustrating examples of components of an image processing apparatus. Referring to FIG. 3, an image processing apparatus 300 includes a prior and encoder 310 and a decoder 330.

For example, an encoder may receive, as an input, a motion trajectory of each of entities, and encode the received motion trajectory into a latent variable indicating relations between the entities. In this example, encoded latent values may be optimized through information of a prior, and decoded into a motion trajectory of the entities in a subsequent frame through the decoder 330.

An input to the prior and encoder 310 may be fed through a fully-connected GNN to generate an embedding of pairs of all the entities in all time steps.

An input to the prior in each time step may generate an embedding per time and per edge through a GNN architecture represented by Equations 5 through 8 below.

$$h_{i,1}^t = f_{emb}(x_i^t) \qquad \text{[Equation 5]}$$

$$v \to e : h_{(i,j),1}^t = f_e^1([h_{i,1}^t, h_{j,1}^t]) \qquad \text{[Equation 6]}$$

$$e \to v : h_{j,2}^t = f_v^1\left(\sum_{i \neq j} h_{(i,j),1}^t\right) \qquad \text{[Equation 7]}$$

$$v \to e : h_{(i,j),emb}^t = f_e^2([h_{i,2}^t, h_{j,2}^t]) \qquad \text{[Equation 8]}$$

The GNN architecture represented by Equations 5 through 8 may embody the form of a neural message to be transferred to a graph. In the equations above, v (vertices) indicates entities, and e (edges) indicates relations between the entities.

In the GNN represented by Equations 5 through 8, $f_{emb}$, $f_e^1$, $f_v^1$, $f_e^2$ may be a 2-layer multi-layer perceptron (MLP) having 256 hidden/output units and an exponential linear unit (ELU) activation function. In addition, LSTM models used by the prior and the encoder may use 64 hidden units.

In the prior and encoder 310, $f_{prior}$ and $f_{enc}$ may be, for example, a 3-layer MLP having 128 hidden units and a rectified linear unit (ReLU) activation function. In such a case, a logit of the encoder may be generated by transferring $h_{emb}$ through a 3-layer MLP having output units in the same number as the number of relation types to be modeled with 256 hidden units.

According to examples, the image processing apparatus 300 may use a recurrent decoder for both a static NRI and a dNRI.

In the foregoing equations, h denotes information of intermediate hidden states of entities or relations during a calculation. A result of the calculation may be an embedding that captures a state of relations between entities i and j at a time t. Each embedding may be fed to an LSTM. The LSTM may intuitively model the evolution of relations between entities over time.

An input to the prior and encoder 310 may be aggregated by using a forward $LSTM_{prior}$ that encodes a past record (or a history) of relations between the entities and a backward $LSTM_{enc}$ that encodes a future record of relations between the entities.

All models f illustrated in FIG. 3 may be MLPs.

An MLP may convert a hidden state in each time step to logits of a prior variance. Such final two steps may be represented by Equations 9 and 10 below.

$$h_{(i,j),prior}^t = LSTM_{prior}(h_{(i,j),emb}^t, h_{(i,j),prior}^{t-1}), \qquad \text{[Equation 9]}$$

$$p_\phi(z^t | x^{1:t}, z^{1:t-1}) = \text{softmax}(f_{prior}(h_{(i,j),prior}^t)). \qquad \text{[Equation 10]}$$

In an example, instead of transferring, as an input, previous relation predictions of the prior, the dependency of the prior on relations in previous time steps of a hidden state $h_{(i,j), prior}$ corresponding to a time step t may be encoded.

The encoder may reuse a relation embedding $h_{(i,j),emb}^t$, and transfer representative values of the relation embedding $h_{(i,j),emb}^t$ through the backward $LSTM_{enc}$. According to examples, the encoder may be embodied by a neural network in a recurrent architecture, such as, for example, a gated recurrent unit (GRU) and a recurrent neural network (RNN), in addition to an LSTM.

A final approximate posterior of the encoder may be obtained by concatenating a reverse state and a forward state provided by the prior and transferring a result of the concatenating to an MLP. The operations of the encoder described above may be represented by Equations 11 and 12 below.

$$h_{(i,j),enc}^t = LSTM_{enc}(h_{(i,j),emb}^t, h_{(i,j),enc}^{t+1}), \qquad \text{[Equation 11]}$$

$$q_\phi(z_{(i,j)}^t | x) = \text{softmax}(f_{enc}([h_{(i,j),enc}^t, h_{(i,j),prior}^t])). \qquad \text{[Equation 12]}$$

The encoder and the prior may share parameters, and thus an encoder parameter $\phi$ may be used for the encoder and the prior.

The prior in the prior and encoder 310 may be calculated only by a function of the history. However, the approximate posterior by the encoder in the prior and encoder 310 may be calculated by a function of the history and the future. A set of edge variables may be sampled from the approximate posterior, and they may be used to select edge models for a decoder GNN.

The decoder 330 may develop a hidden state by using such a GNN and previous predictions, and then use hidden states that predict a state of the entities in a next time step.

Hereinafter, a training process based on an NRI method will be described before describing a process of training parameters $\phi$ and $\theta$ of the prior and encoder 310 and the decoder 330.

The encoder may process a current input x to predict a posterior relation probability $q_\phi(z|x)$ for pairs of all the entities. The encoder may then sample a set of relations from a detailed approximate value to this distribution. When such samples $\tilde{z}$ are given, a final step is to predict an original trajectory X. Through this, it is possible to improve decoding performance, and verify whether the decoder 330 is dependent on a predicted edge. For example, by providing the decoder 330 with ground-truth inputs for a limited number (e.g., 10) of steps in a training period, it is possible to predict a remainder of a trajectory with a previous prediction function.

The ELBO represented in Equation 1 may include two terms as follows. First, a reconstruction error may indicate a mean of a Gaussian distribution having a variance $\sigma$ in which a predicted output is fixed, and be represented in the form as represented by Equation 13 below.

$$-\sum_i \sum_{t=2}^T \frac{\|x_i^t - \hat{x}_i^t\|}{2\sigma^2} + const. \qquad \text{[Equation 13]}$$

In addition, a KL-divergence may indicate a variance between a uniform prior and a predicted approximate posterior, and be represented in the form as represented by Equation 14 below.

$$\sum_{i \ne j} H(q_\phi(z_{ij} \mid x)) + const. \quad \text{[Equation 14]}$$

In Equation 14, H denotes an entropy function. A constant term may be a result of the uniform prior, which may cause marginalization of one of encoder terms in a loss.

An NRI model may be an unsupervised model that may infer interactions from observed data and explicitly represent them. A modified automatic encoder model in which a latent code indicates a basic interaction graph in the form of an adjacency matrix may be formulated. Both an encoder model and a reconstruction model may be based on a GNN. Dissimilar to a dNRI model, a static NRI model may assume that an interaction is maintained the same over time. An NRI formulation may assume that relations between all the entities are static. However, such an assumption may be too strong in many application programs. How entities interact with one another may tend to change over time. For example, basketball players may adjust their positions relative to positions of other players in the same team at other time points.

Thus, in an example, a dNRI method may be used to identify a dynamic interaction and more effectively track entities of which a relation therebetween changes over time.

For example, it is possible to predict a separate relation $z_{i,j}^t$ in each time step t. The separate relation $z_{i,j}^t$ may allow a model to respond to entities of which a relation therebetween changes over time through a trajectory, and thus improve an ability to predict future states. To use the dNRI method, an evolution of a relation between entities over time may need to be tracked, which may not be needed for a static NRI.

In an example, to predict a separate relation in each time step, a purpose or objective of each of components or elements of each model may need to be considered. As described above, the prior may be an adjustable element of a loss function. To make the prior more useful in a sequential context, relations between entities at all time points may be predicted when all previous states are given to the image processing apparatus 300. For example, while, in the static NRI method, the encoder uses a single edge prediction set including an entire set of input trajectories, it is possible to use the encoder while understanding state information of a system at all time points based on a past and a future. Such state information may be transferred from the encoder to the prior during training by a KL-divergence term of the loss function. Such a change may allow the prior to more effectively predict a future relation. As a result of sequential relation prediction, the decoder 330 may become more flexible. Through this, based on how the system changes, different models may be used at each time point. All such changes may lead to a more representative model that improves the prediction performance.

For example, an input trajectory x input to the image processing apparatus 300 may pass through a GNN model, and generate a relation embedding $h^t_{(i,j),emb}$ for each time t and for each pair (i, j) of all the entities. The relation embedding $h^t_{(i,j),emb}$ may be transferred to a forward LSTM and/or a backward LSTM. Through which, a prior $p_\phi(z|x)$ and an approximate posterior $q_\phi(z|x)$ may be calculated. Subsequently, the encoder may generate a relation variable $\tilde{z}$ through sampling in the approximate posterior $q_\phi(z|x)$. When such samples (e.g., $\tilde{z}$) are given, the decoder 330 may predict a trajectory distribution $p_\theta(x|\tilde{z})$.

In contrast to the static NRI, it is possible to provide the decoder 330 with ground-truth states as an input during training. The providing of a ground truth for a fixed number of steps may be observed in a test, and then a prediction may be used as an input for a remaining trajectory.

According to examples, the reconstruction error in the ELBO may be calculated in the same way as represented by Equation 13 above, and the KL-divergence may be calculated as represented by Equation 15 below.

$$\sum_{t=1}^{T} \left( H(q_\phi(z_{ij}^t \mid x)) - \sum_{z_{ij}^t} q_\phi(z_{ij}^t \mid x) \log p_\phi(z_{ij}^t \mid x^{1:t}, z^{1:t-1}) \right). \quad \text{[Equation 15]}$$

In an example, in a test, future states of a system may be predicted. This indicates that, because appropriate information of the future may not be obtained, an edge may not be predicted by using the encoder. Thus, when a previous prediction $x^{1:t}$ is given, a prior distribution of relations $p_\phi(z^{1:t}|x^{1:t}, z^{1:t-1})$ may be calculated. In addition, to obtain a relation prediction $\tilde{z}^t$, sampling may be performed from the prior, and the relation prediction $\tilde{z}^t$ may be used in addition to the previous prediction to estimate a next state of variables $p_\theta(x^{t+1}|x^{1:t}, \tilde{z}^{1:t})$. Such a process described above may be continued until an overall motion trajectory is predicted.

Figure 4:
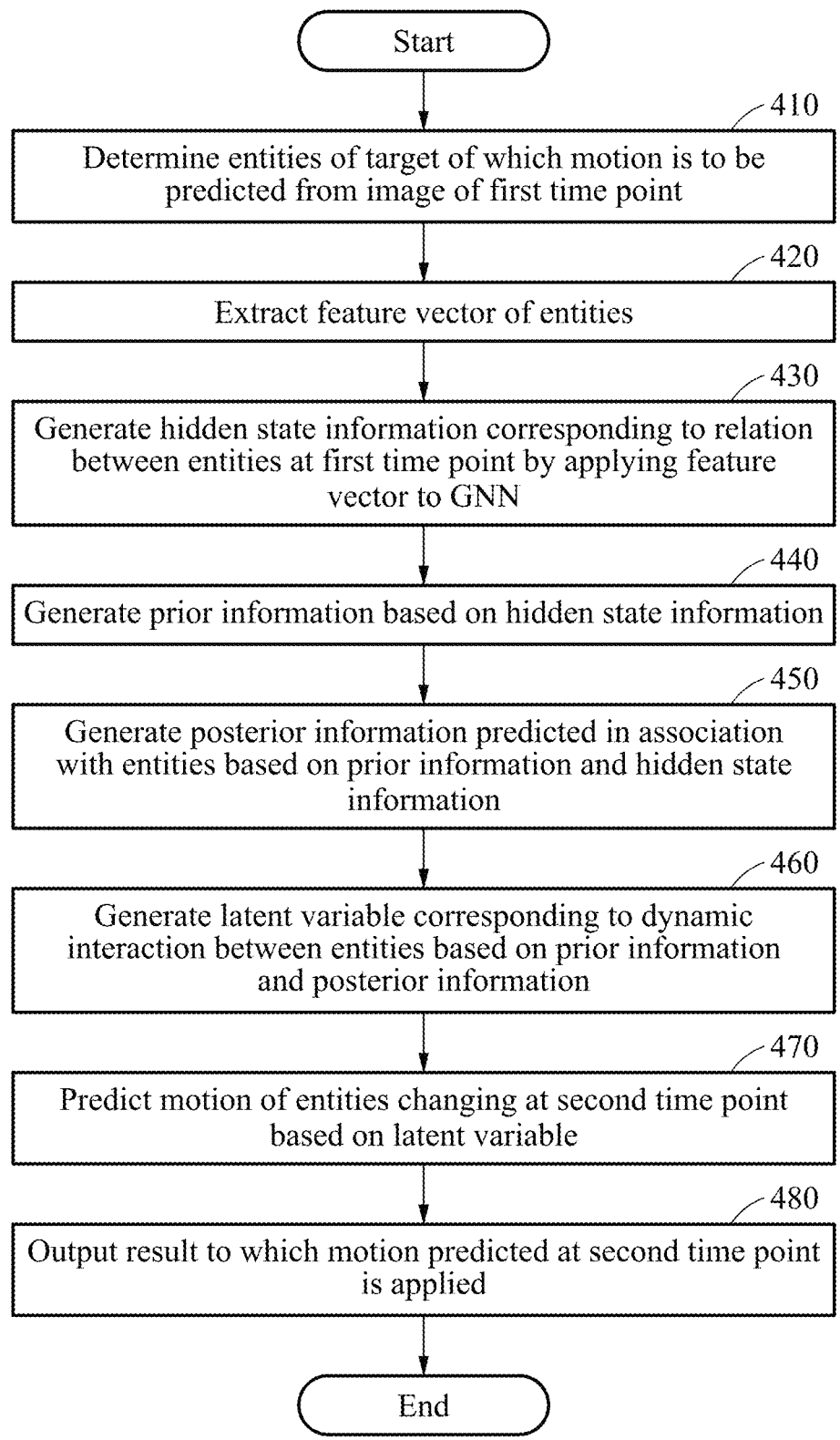
FIG. 4 is a diagram illustrating another example of an image processing method.

FIG. 4 is a diagram illustrating another example of an image processing method. The operations in FIG. 4 may be performed in the sequence and manner as shown, although the order of some operations may be changed or some of the operations omitted without departing from the spirit and scope of the illustrative examples described. Many of the operations shown in FIG. 4 may be performed in parallel or concurrently. One or more blocks of FIG. 4, and combinations of the blocks, can be implemented by special purpose hardware-based computer, such as a processor, that perform the specified functions, or combinations of special purpose hardware and computer instructions. In addition to the description of FIG. 4 below, the descriptions of FIGS. 1-3 are also applicable to FIG. 4, and are incorporated herein by reference. Thus, the above description may not be repeated here.

Referring to FIG. 4, in operation 410, an image processing apparatus determines entities of a target of which a motion is to be predicted from an image of a first time point. For example, the image processing apparatus may receive, as an input, a selection of a target included in an input image directly from a user. In another example, the image processing apparatus may automatically and directly set a target included in an input image.

In operation 420, the image processing apparatus extracts a feature vector of the entities determined in operation 410.

In operation 430, the image processing apparatus generates hidden state information corresponding to relations between the entities at the first time point by applying the feature vector extracted in operation 420 to a GNN.

In operation 440, the image processing apparatus generates prior information based on the hidden state information generated in operation 430.

In operation 450, the image processing apparatus generates posterior information predicted in association with the entities based on the prior information generated in operation 440 and the hidden state information generated in operation 430.

In operation 460, the image processing apparatus generates a latent variable corresponding to a dynamic interaction between the entities based on the prior information generated in operation 440 and the posterior information generated in operation 450.

In operation 470, the image processing apparatus predicts a motion of the entities changing at a second time point based on the latent variable generated in operation 460.

In operation 480, the image processing apparatus outputs a result to which the motion predicted at the second time point is applied.

Figure 5:
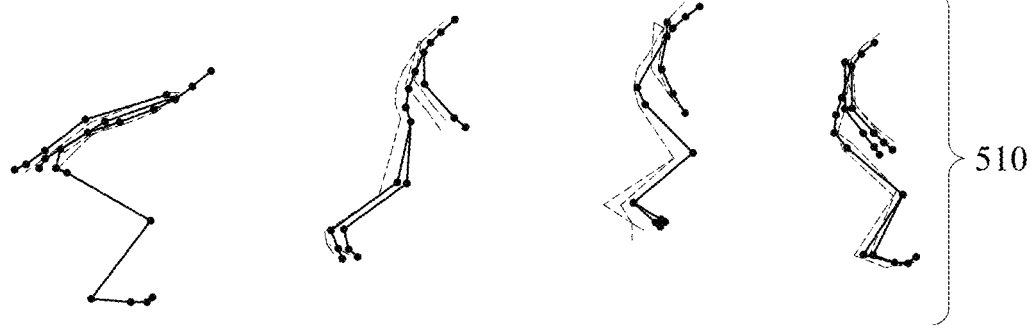
FIG. 5 is a diagram illustrating an example of a result to which a motion of a human body predicted by an image processing method is applied.
Figure 5:
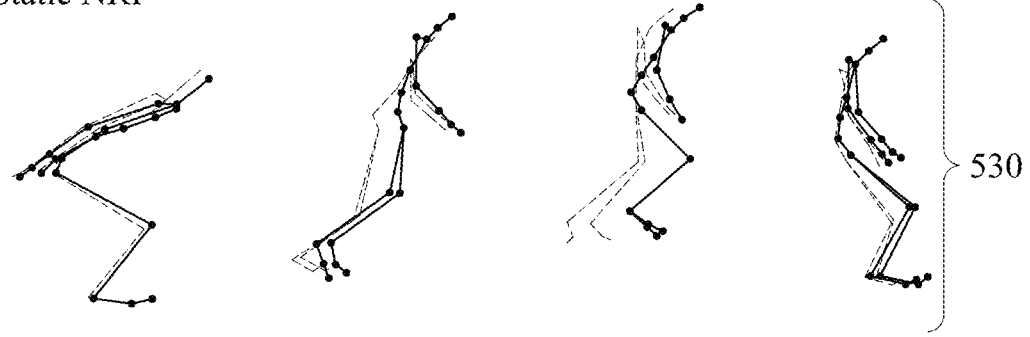
Figure 5:
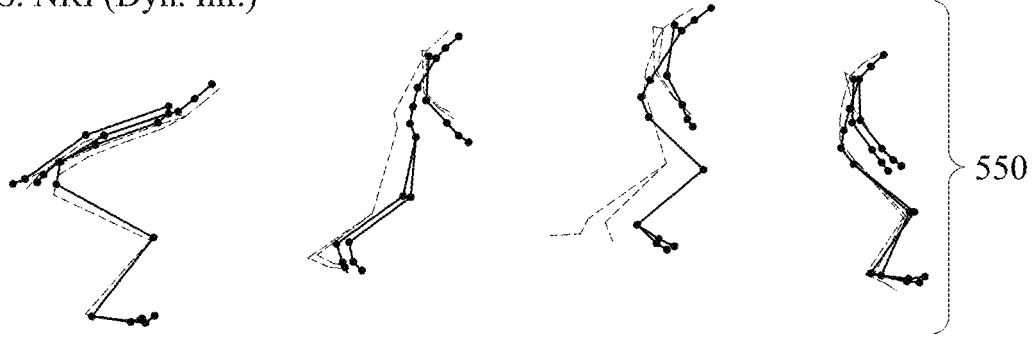
Figure 6:
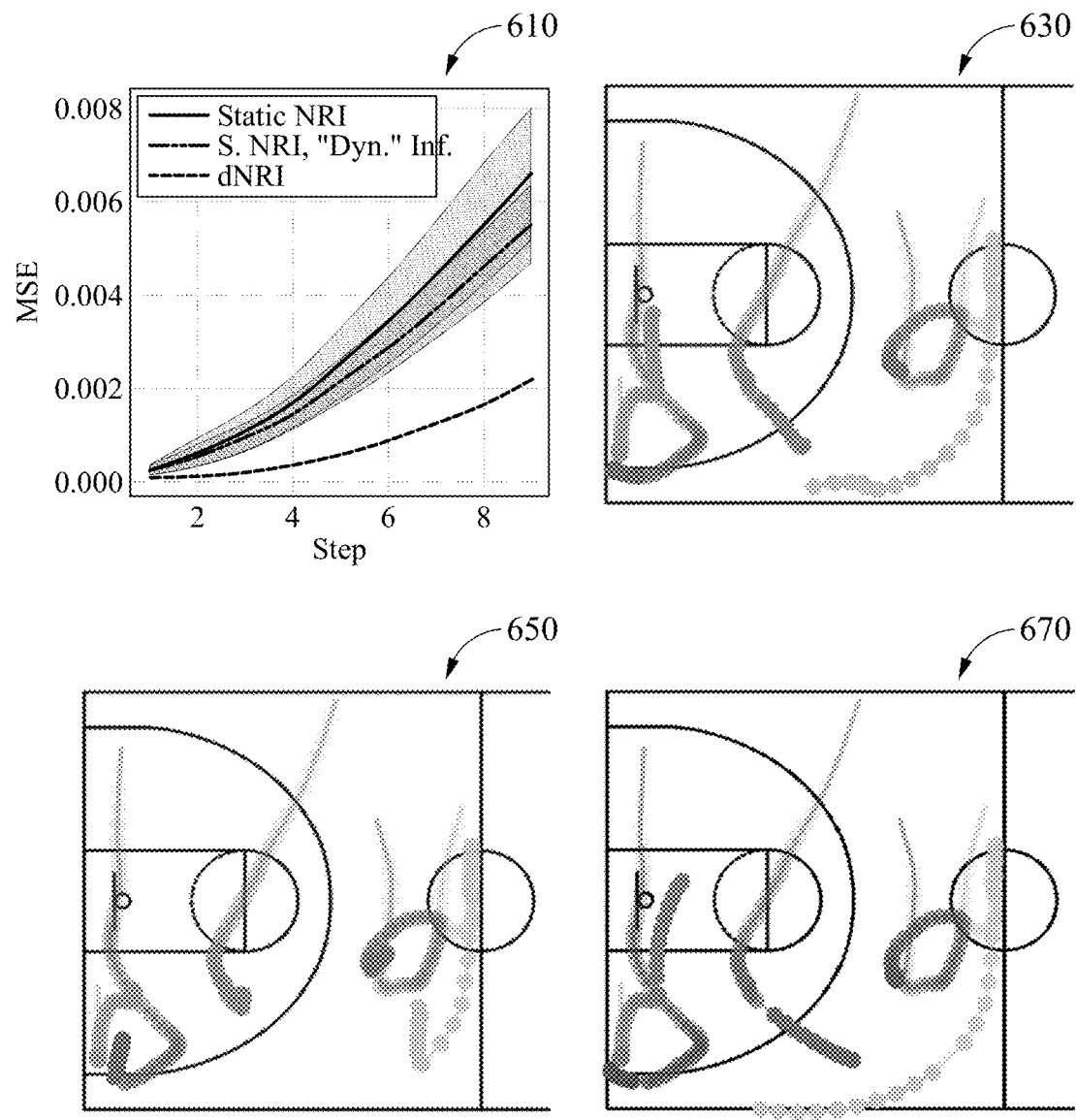
FIG. 6 is a diagram illustrating an example of a motion trajectory to which a motion of basketball players predicted by an image processing method is applied.

To verify effects of a dNRI in comparison with a static NRI, an experiment may be performed on human motion capture datasets and motion trajectory datasets of basketball players as illustrated in FIGS. 5 and 6.

In the examples of FIGS. 5 and 6, sample trajectories and predicted relations may be additionally visualized to show operations of models. All the models may hard-code a first edge type to indicate that there is no interaction. For the purpose of evaluation, initial n time steps of an input may be provided to the models, and future steps may need to be predicted. To evaluate a static model, two different inference processes may be used.

In the examples of FIGS. 5 and 6, an inference process represented as "S. NRI, Dyn. Inf." may indicate a result of evaluating a relation prediction by using most recent n trajectory predictions, and an inference process represented as "Static NRI" may indicate a result of evaluating a relation prediction by using an input of initial n time steps provided to predict relation types. Such relations may be used to decode all motion trajectories.

FIG. 5 is a diagram illustrating an example of a result to which a motion of a human body predicted by an image processing method described herein is applied. Referring to FIG. 5, illustrated are results of sampling a motion predicted through a dNRI model 510, a static NRI model 530, and a static NRI model having a dynamic inference, S. NRI (Dyn. Inf.), 550, with respect to a test trajectory of a motion capture target using four relation types. A solid-line human body skeleton indicates a ground-truth state, and a broken-line human body skeleton indicates a result of predicting a motion by each inference model. Each frame may be predicted every 20 time steps after a most recent ground-truth is provided.

Referring to FIG. 5, illustrated are four time steps predicted for a static model and a dynamic model. Although all the models may capture a general jumping motion, the dNRI model 510 may more accurately track positions of legs and hip joints. As illustrated in FIG. 5, the dNRI model 510 may predict future frames of a gait cycle without departing far from a ground-truth skeleton. However, the static models 530 and 550 may generate an error as a greater number of future frames are predicted. Such an error may be generated at a point at which important deformities occur.

FIG. 6 is a diagram illustrating an example of a motion trajectory to which a motion of basketball players predicted by an image processing method described herein is applied. Referring to FIG. 6, illustrated are results of conducting an experiment on each model using trajectory data of basketball players.

A graph 610 on a left side of FIG. 6 indicates an error in predictions of each model, for example, the dNRI model 510, the static NRI model 530, and the S. NRI (Dyn. Inf.) model 550 having a dynamic inference, with respect to trajectory data of basketball players. Drawings indicated by reference numerals 630, 650, and 670 illustrate samples of trajectory predictions using each model.

The drawing indicated by reference numeral 630 indicates a ground-truth result, the drawing indicated by reference numeral 650 indicates an inference result of a static NRI model, and the drawing indicated by reference numeral 670 indicates an inference result of a dNRI model.

Motion trajectories illustrated in the drawings 630, 650, and 670 may include two-dimensional (2D) positions and speeds of 5 players included in an offensive team. The 2D positions and speeds of the offensive team may be processed in advance by 49 frames which are played for approximately 8 seconds. Here, all the models may be trained in first 40 frames of a training trajectory. In an evaluation process, the first 40 input frames may be provided to these models, and a task of predicting the next 9 frames may be performed. For example, the models that predict two relation types may be trained.

Referring to FIG. 6, when predicting a motion trajectory of basketball players, a dNRI model may more accurately predict the motion trajectory, compared to a static NRI model. As described above, by an image processing method described herein, it is possible to predict a motion of each of players playing a sports game based on a relation between the players.

Figure 7:
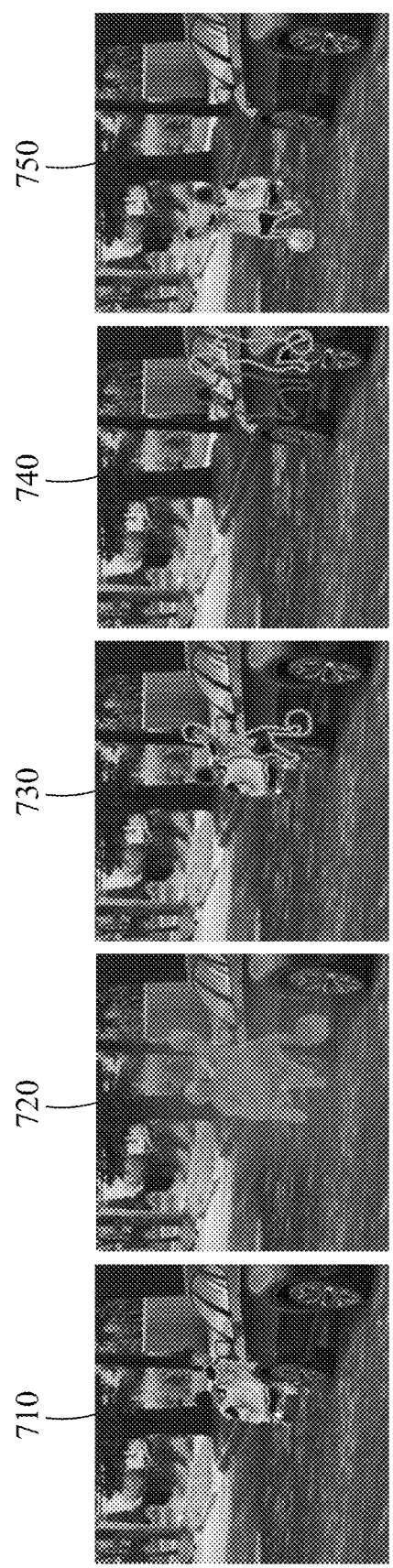
FIG. 7 illustrates an example of a process of generating an image of a future time point by applying a motion of pedestrians predicted by an image processing method.

FIG. 7 illustrates an example of a process of generating an image of a future time point by applying a motion of pedestrians predicted by an image processing method. In the example of FIG. 7, illustrated is an image 710 of children playing with a ball around a vehicle parked in front of a vehicle that is currently traveling.

In an example, a dNRI method may be used to process a system in which relations between entities are predicted to change over time. In addition, modeling the relations between dynamic entities may improve performance in both human motion capture and sports trajectory prediction tasks. In addition, such a model may be applied to other fields, for example, traffic systems and biological neural networks, in which a dynamic relation is predicted.

Alternatively, modeling a motion of a target object predicted in a video by the image processing method may also be applied to various applications.

In the example of FIG. 7, an image processing apparatus may define relations between entities of a target of which a motion is to be predicted, for example, children playing with a ball, based on a feature vector of the entities extracted from the image 710. Here, the relations between the entities may be defined by hidden state information generated in association with a state of relations between pairs of the entities.

The image processing apparatus may generate prior information corresponding to the entities based on the hidden state information, as shown in an image 720. The prior information may include the form of a motion of the children that is hidden by the parked vehicle. The prior information may be determined based on a history of the entities determined from a previous image of the image 710 and on feature vectors of the entities corresponding to the image 710.

The image processing apparatus may generate a latent variable corresponding to a dynamic interaction between the entities based on the hidden state information generated from the image 710 and the prior information such as the image 720.

The image processing apparatus may generate a predicted image 730 such that the form of the motion of the children hidden by the parked vehicle in the image 710 is revealed, or generate future images, for example, an image 740 and an image 750, that are predicted after a time point at which the image 710 is captured.

In an example, by applying the image processing method to a prediction of a target or entities of the target hidden from a current frame, it is possible to help a driver drive safely by providing the driver with predicted information associated with pedestrians or by warning the driver of a danger in case of danger, when the driver is driving a vehicle or a self-driving vehicle is traveling.

The image processing method may be applied to, for example, video segmentation such as instance segmentation and amodal segmentation, or video tracking, in various electronic products.

Figure 8:
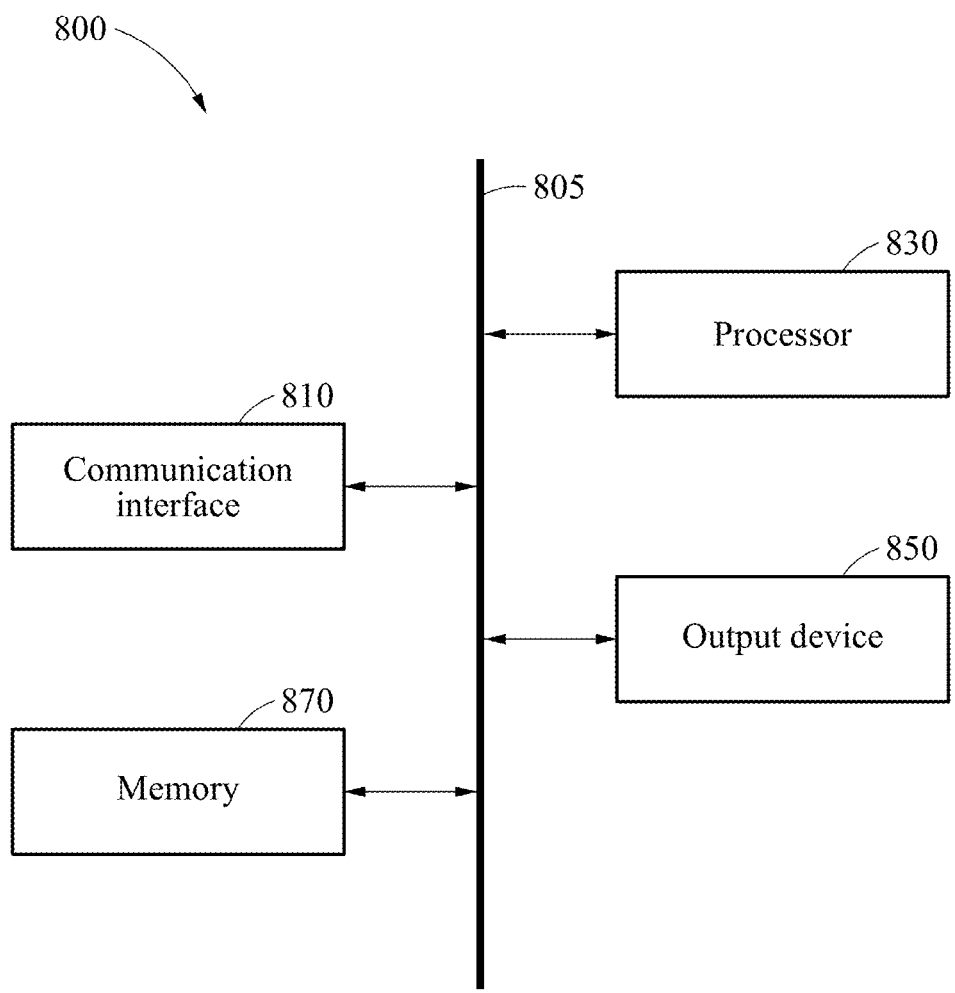
FIG. 8 is a diagram illustrating an example of an image processing apparatus.

FIG. 8 is a diagram illustrating an example of an image processing apparatus. Referring to FIG. 8, an image processing apparatus 800 includes a communication interface 810, a processor 830, an output device 850, and a memory 870. The communication interface 810, the processor 830, the output device 850, and the memory 870 may communicate with one another through a communication bus 805. The image processing apparatus 800 may be, for example, a head-up display (HUD), a three-dimensional (3D) digital information display (DID) (3D DID), a 3D mobile device, and a smart vehicle.

The communication interface 810 may receive an image of a first time point including entities of a target of which a motion is to be predicted.

The processor 830 may extract a feature vector of the entities from the image of the first time point. The processor 830 may estimate a dynamic interaction between the entities at the first time point based on relations between the entities defined based on the feature vector. The processor 830 may predict a motion of the entities changing at a second time point based on the estimated dynamic interaction. The processor 830 may include a prior, an encoder, and a decoder, as illustrated in FIGS. 2 and 3.

The output device 850 may output a result to which the motion predicted at the second time point is applied. The output device 850 may be, for example, a display device such as an HUD, or a sound device such as a speaker.

According to examples, the communication interface 810 may receive the feature vector of the entities extracted from the image of the first time point. In such a case, without extracting the feature vector, the processor 830 may estimate the dynamic interaction between the entities at the first time point based on the relations between the entities defined based on the feature vector, and predict the motion of the entities changing at the second time point based on the estimated dynamic interaction.

The memory 870 may store the image of the first time point received through the communication interface 810 or the feature vector of the entities in the image of the first time point that is received through the communication interface 810. In addition, the memory 850 may store prior information generated by the processor 830, a latent variable corresponding to the dynamic interaction between the entities that is estimated by the processor 830, and/or the motion of the entities changing at the second time point that is predicted by the processor 830.

The memory 870 may store various sets of information generated in a processing operation of the processor 830 described in the foregoing. In addition, the memory 870 may store various sets of data and programs, and the like. The memory 870 may include a volatile or nonvolatile memory. The memory 870 may include a massive storage medium such as a hard disk to store various sets of data. Further details regarding the memory 870 is provided below.

In addition, the processor 830 may perform one or more, or all, of operations and methods described above with reference to FIGS. 1 through 7, and algorithms corresponding to the one or more, or all, of the operations and methods.

The processor 830 may be a data processing device embodied by hardware having a circuit of a physical structure to execute desired operations. The desired operations may include, for example, codes or instructions included in a program. The data processing device embodied by hardware may include, for example, a microprocessor, a central processing unit (CPU), a processor core, a multi-core processor, a multiprocessor, an application-specific integrated circuit (ASIC), and a field-programmable gate array (FPGA). Further details regarding the processor 830 is provided below.

The image processing apparatus, image processing apparatus 200, prior 210, encoder 230, decoder 250, image processing apparatus 300, prior and encoder 310, decoder 330, and other apparatuses, devices, units, modules, and components described herein with respect to FIGS. 2, 3, and 8 are implemented by hardware components. Examples of hardware components that may be used to perform the operations described in this application where appropriate include controllers, sensors, generators, drivers, memories, comparators, arithmetic logic units, adders, subtractors, multipliers, dividers, integrators, and any other electronic components configured to perform the operations described in this application. In other examples, one or more of the hardware components that perform the operations described in this application are implemented by computing hardware, for example, by one or more processors or computers. A processor or computer may be implemented by one or more processing elements, such as an array of logic gates, a controller and an arithmetic logic unit, a digital signal processor, a microcomputer, a programmable logic controller, a field-programmable gate array, a programmable logic array, a microprocessor, or any other device or combination of devices that is configured to respond to and execute instructions in a defined manner to achieve a desired result. In one example, a processor or computer includes, or is connected to, one or more memories storing instructions or software that are executed by the processor or computer. Hardware components implemented by a processor or computer may execute instructions or software, such as an operating system (OS) and one or more software applications that run on the OS, to perform the operations described in this application. The hardware components may also access, manipulate, process, create, and store data in response to execution of the instructions or software. For simplicity, the singular term "processor" or "computer" may be used in the description of the examples described in this application, but in other examples multiple processors or computers may be used, or a processor or computer may include multiple processing elements, or multiple types of processing elements, or both. For example, a single hardware component or two or more hardware components may be implemented by a single processor, or two or more processors, or a processor and a controller. One or more hardware components may be implemented by one or more processors, or a processor and a controller, and one or more other hardware components may be implemented by one or more other processors, or another processor and another controller. One or more processors, or a processor and a controller, may implement a single hardware component, or two or more hardware components. A hardware component may have any one or more of different processing configurations, examples of which include a single processor, independent processors, parallel processors, single-instruction single-data (SISD) multiprocessing, single-instruction multiple-data (SIMD) multiprocessing, multiple-instruction single-data (MISD) multiprocessing, multiple-instruction multiple-data (MIMD) multiprocessing, a controller and an arithmetic logic unit (ALU), a DSP, a microcomputer, an FPGA, a programmable logic unit (PLU), a central processing unit (CPU), a graphics processing unit (GPU), a neural processing unit (NPU), or any other device capable of responding to and executing instructions in a defined manner.

The methods illustrated in FIGS. 1-8 that perform the operations described in this application are performed by computing hardware, for example, by one or more processors or computers, implemented as described above executing instructions or software to perform the operations described in this application that are performed by the methods. For example, a single operation or two or more operations may be performed by a single processor, or two or more processors, or a processor and a controller. One or more operations may be performed by one or more processors, or a processor and a controller, and one or more other operations may be performed by one or more other processors, or another processor and another controller. One or more processors, or a processor and a controller, may perform a single operation, or two or more operations.

Instructions or software to control a processor or computer to implement the hardware components and perform the methods as described above are written as computer programs, code segments, instructions or any combination thereof, for individually or collectively instructing or configuring the processor or computer to operate as a machine or special-purpose computer to perform the operations performed by the hardware components and the methods as described above. In one example, the instructions or software include machine code that is directly executed by the processor or computer, such as machine code produced by a compiler. In an example, the instructions or software includes at least one of an applet, a dynamic link library (DLL), middleware, firmware, a device driver, an application program storing the image processing method. In another example, the instructions or software include higher-level code that is executed by the processor or computer using an interpreter. Programmers of ordinary skill in the art can readily write the instructions or software based on the block diagrams and the flow charts illustrated in the drawings and the corresponding descriptions in the specification, which disclose algorithms for performing the operations performed by the hardware components and the methods as described above.

The instructions or software to control a processor or computer to implement the hardware components and perform the methods as described above, and any associated data, data files, and data structures, are recorded, stored, or fixed in or on one or more non-transitory computer-readable storage media. Examples of a non-transitory computer-readable storage medium include read-only memory (ROM), random-access programmable read only memory (PROM), electrically erasable programmable read-only memory (EEPROM), random-access memory (RAM), dynamic random access memory (DRAM), static random access memory (SRAM), flash memory, non-volatile memory, CD-ROMs, CD-Rs, CD+Rs, CD-RWs, CD+RWs, DVD-ROMs. DVD-Rs, DVD+Rs, DVD-RWs, DVD+RWs, DVD-RAMs, BD-ROMs, BD-Rs, BD-R LTHs, BD-REs, blue-ray or optical disk storage, hard disk drive (HDD), solid state drive (SSD), flash memory, a card type memory such as multimedia card micro or a card (for example, secure digital (SD) or extreme digital (XD)), magnetic tapes, floppy disks, magneto-optical data storage devices, optical data storage devices, hard disks, solid-state disks, and any other device that is configured to store the instructions or software and any associated data, data files, and data structures in a non-transitory manner and providing the instructions or software and any associated data, data files, and data structures to a processor or computer so that the processor or computer can execute the instructions.

While this disclosure includes specific examples, it will be apparent after an understanding of the disclosure of this application that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents.

Therefore, the scope of the disclosure is defined not by the detailed description, but by the claims and their equivalents, and all variations within the scope of the claims and their equivalents are to be construed as being included in the disclosure.

What is claimed is:

1. An image processing method comprising:
defining relations between entities of a target of which a motion is to be predicted from an image of a first time point based on a feature vector of the entities;
estimating a dynamic interaction between the entities at the first time point based on the defined relations between the entities, including sampling a result in which prior information and posterior information are combined and generating a latent variable corresponding to the dynamic interaction between the entities at the first time point based on a result of the sampling;
predicting a motion of the entities changing at a second time point based on the estimated dynamic interaction and the latent variable; and
outputting a result to which the motion predicted at the second time point is applied.

2. The image processing method of claim 1, wherein the relations between the entities are determined based on at least one of connections between the entities, positions of the entities, postures of the entities, movement directions of the entities, movement speeds of the entities, motion trajectories of the entities, a rule applied to the entities, motion patterns of the entities based on the rule, a regulation applied to the entities, or motion patterns of the entities based on the regulation.

3. The image processing method of claim 1, wherein the defining of the relations between the entities comprises:
generating hidden state information corresponding to the relations between the entities at the first time point by applying the feature vector to a graph neural network (GNN) comprising nodes corresponding to the entities and edges corresponding to the relations between the entities.

4. The image processing method of claim 3, wherein the GNN comprises:
a fully-connected GNN configured to generate the hidden state information corresponding to a state of relations between pairs of the entities based on the feature vector.

5. The image processing method of claim 3, wherein the estimating of the dynamic interaction comprises:
generating prior information corresponding to the entities based on the hidden state information;

generating posterior information predicted in association with the entities based on the prior information and the hidden state information; and generating the latent variable corresponding to the dynamic interaction between the entities based on the prior information and the posterior information.

6. The image processing method of claim 5, wherein the prior information is determined based on a history of relations between the entities up to a time point before the first time point, and on feature vectors of the entities input up to the first time point.

7. The image processing method of claim 5, wherein the generating of the prior information comprises:

generating the prior information by transferring the hidden state information as forward state information to a forward long short-term memory (LSTM).

8. The image processing method of claim 5, wherein the generating of the posterior information comprises:

generating the posterior information by transferring the prior information and the hidden state information as backward state information to a backward LSTM.

9. The image processing method of claim 1, wherein the entities of the target comprise at least one of body parts of a user, joints of a user, pedestrians, vehicles, or players of a sports team.

10. The image processing method of claim 1, wherein the predicting of the motion of the entities comprises:

predicting the motion changing at the second time point by decoding the estimated dynamic interaction.

11. The image processing method of claim 1, wherein the outputting of the result to which the predicted motion is applied comprises:

processing the image of the first time point to be an image of the second time point by applying the predicted motion to the entities comprised in the image of the first time point; and outputting the image of the second time point.

12. The image processing method of claim 1, wherein the outputting of the result to which the predicted motion is applied comprises:

processing the image of the first time point to be an image of the second time point by applying the predicted motion to the entities comprised in the image of the first time point;

perceiving whether a dangerous situation occurs based on the image of the second time point; and outputting an alarm corresponding to the dangerous situation.

13. The image processing method of claim 1, further comprising:

determining the entities of the target of which the motion is to be predicted.

14. A non-transitory computer-readable storage medium storing instructions that, when executed by a processor, causes the processor to perform the image processing method of claim 1.

15. The image processing method of claim 1, wherein the generating of the latent variable comprises:

optimizing the latent variable based on the prior information.

16. An image processing apparatus comprising:

a communication interface configured to receive an image of a first time point comprising entities of a target of which a motion is to be predicted;

a processor configured to extract a feature vector of the entities from the image of the first timepoint, to estimate a dynamic interaction between the entities at the first time point based on relations between the entities defined based on the feature vector, including sampling a result in which prior information and posterior information are combined and generating a latent variable corresponding to the dynamic interaction between the entities at the first time point based on a result of the sampling, and to predict a motion of the entities changing at a second time point based on the estimated dynamic interaction and the latent variable; and an output device configured to output a result to which the motion predicted at the second time point is applied.

17. The image processing apparatus of claim 16, wherein the processor further comprises:

a prior configured to generate the prior information that is determined based on a history of relations between the entities up to a time point before the first time point and on feature vectors corresponding to the entities input up to the first time point;

an encoder configured to generate the latent variable corresponding to the dynamic interaction between the entities based on the feature vector and the prior information; and a decoder configured to predict the motion of the entities changing at the second time point based on the latent variable.

18. The image processing apparatus of claim 17, wherein the encoder comprises:

a fully-connected graph neural network (GNN) configured to generate hidden state information corresponding to a state of relations between pairs of the entities based on the feature vector;

a forward long short-term memory (LSTM) configured to generate the prior information corresponding to the entities of the target in the image of the first time point based on the hidden state information;

a backward LSTM configured to generate the posterior information predicted based on the dynamic interaction between the entities based on the prior information and the hidden state information; and a multi-layer perceptron (MLP) configured to generate the latent variable corresponding to the dynamic interaction between the entities at the first time point based on the prior information transferred through the forward LSTM and the posterior information transferred through the backward LSTM.

19. The image processing apparatus of claim 16, comprising at least one of a head-up display (HUD), a three-dimensional (3D) digital information display (DID) (3D DID), a 3D mobile device, or a smart vehicle.

* * * * *